United States Patent
Hu et al.

(10) Patent No.: US 6,975,477 B1
(45) Date of Patent: Dec. 13, 2005

(54) MICRO ACTUATOR DC GAIN CALIBRATION SCHEME FOR HDD DUAL-STAGE ACTUATOR SYSTEMS

(75) Inventors: Xiaoping Hu, San Jose, CA (US); Lin Guo, Milpitas, CA (US); Wei Guo, Fremont, CA (US); Jong-Ming Lin, Cupertino, CA (US)

(73) Assignee: Maxtor Corporation, Longmont, CO (US)

( * ) Notice: Subject to any disclaimer, the term of this patent is extended or adjusted under 35 U.S.C. 154(b) by 182 days.

(21) Appl. No.: 10/430,368

(22) Filed: May 5, 2003

Related U.S. Application Data
(60) Provisional application No. 60/377,927, filed on May 3, 2002.

(51) Int. Cl.[7] .......................... G11B 15/18; G11B 5/596
(52) U.S. Cl. ........................ 360/71; 360/75; 360/78.05
(58) Field of Search .................. 360/71, 75, 78.05, 360/78.09, 78.12; 318/560, 568.17; 369/44.11, 44.28, 44.35

(56) References Cited

U.S. PATENT DOCUMENTS 5,452,275 A * 9/1995 Ogawa ................ 369/44.11
6,088,187 A * 7/2000 Takaishi ................ 360/78.05
6,741,417 B2 * 5/2004 Hsin et al. ............... 360/78.05

* cited by examiner

*Primary Examiner*—Andrew L. Sniezek
*Assistant Examiner*—K. Wong
(74) *Attorney, Agent, or Firm*—Tejpal S. Hansra

(57) ABSTRACT

A servo system for displacing a head relative to a disk of a hard disk drive. The servo system comprises a dual-stage actuator, a calibration signal generator, and a calibration factor generator. The calibration signal generator generates a calibration signal having a calibration portion. The calibration factor generator generates a calibration factor. The servo system operates in operating and calibration servo modes. In the operating mode, the system defines first and second servo loops. The calibration factor is used as one of the parameters of the second servo loop. In the calibration servo mode, the calibration signal forms the second control signal, and the calibration factor generator generates the calibration factor based on movement of the head before any substantial response of the third servo loop to the calibration portion.

60 Claims, 8 Drawing Sheets

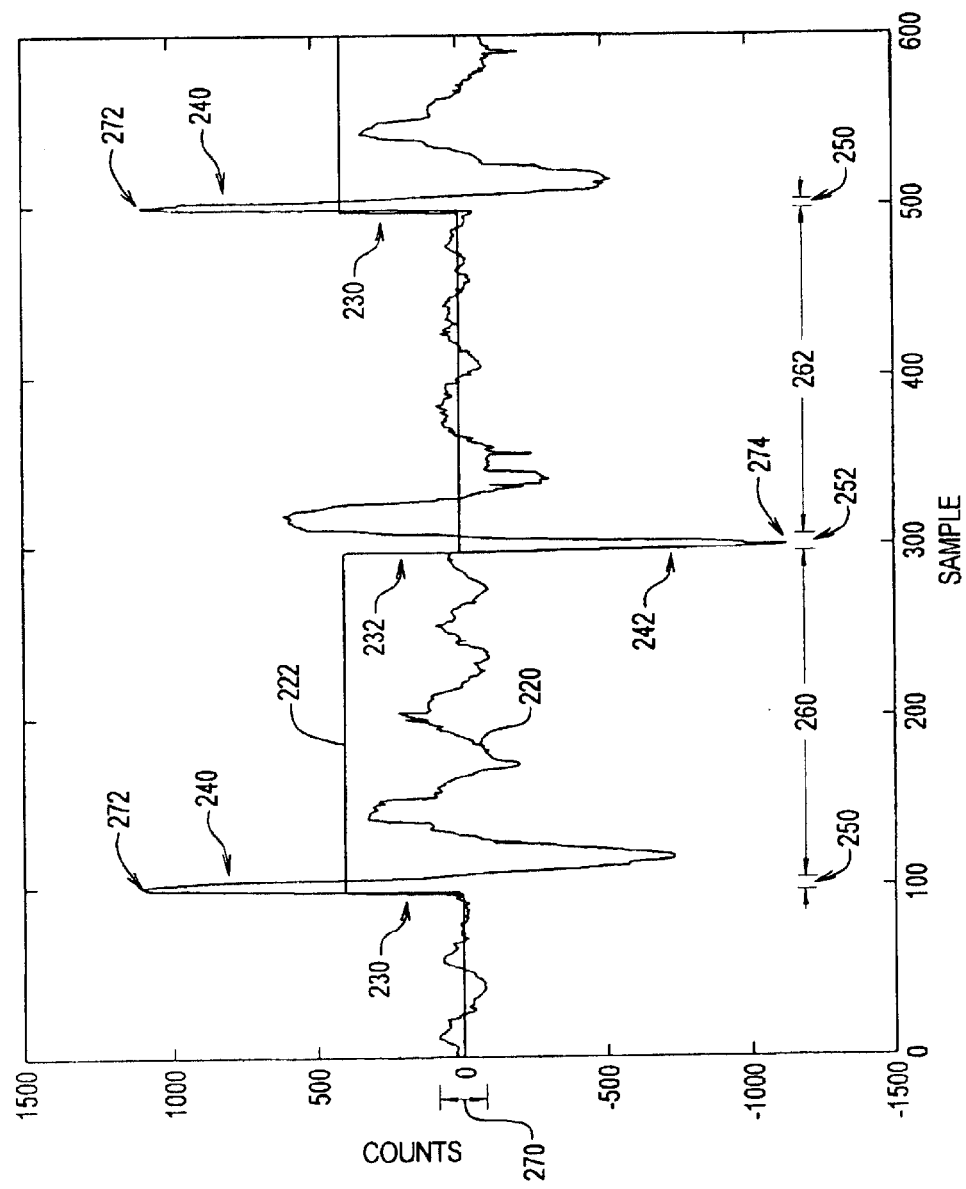

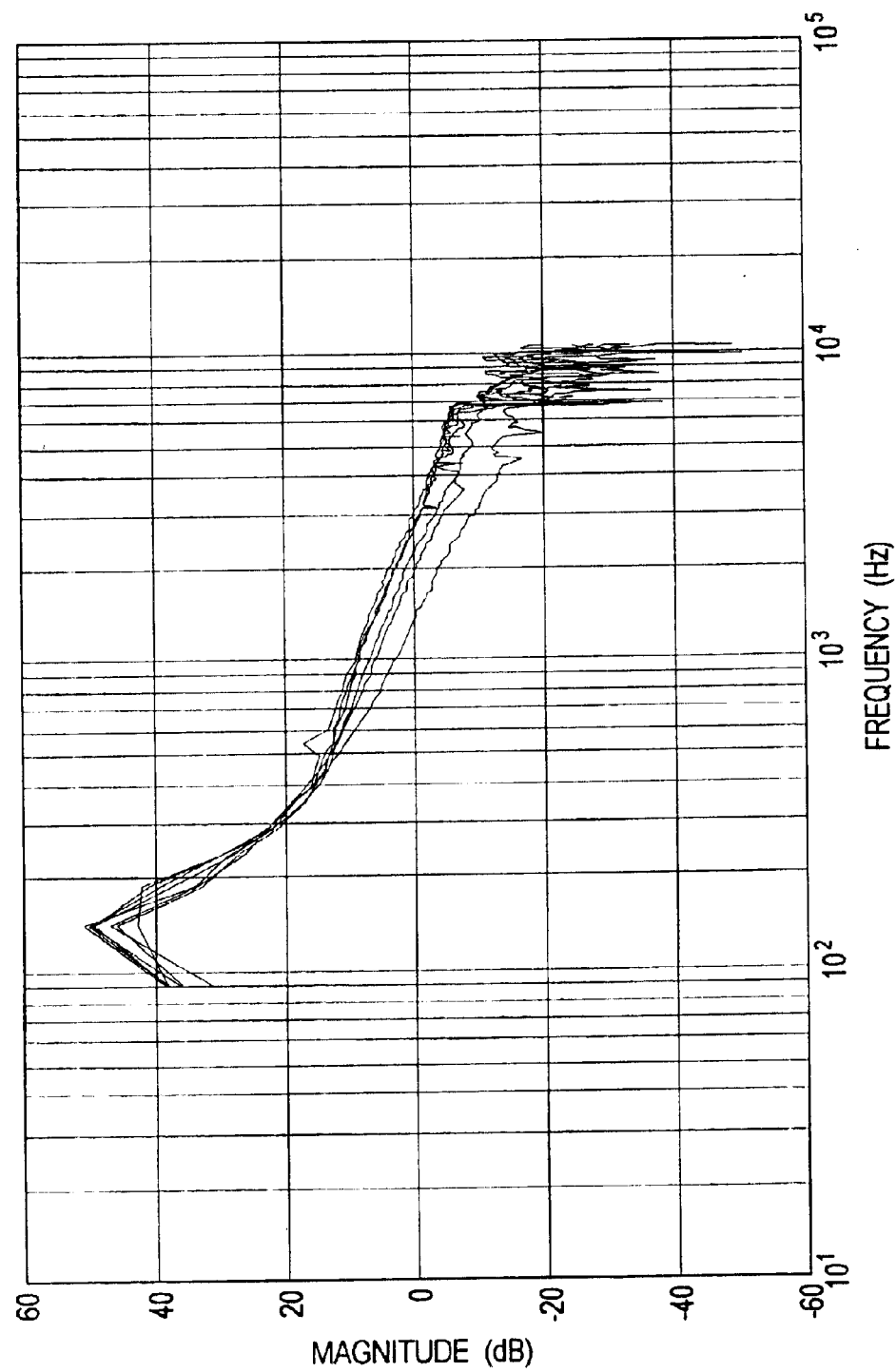

MICRO ACTUATOR DC GAIN CALIBRATION SCHEME FOR HDD DUAL-STAGE ACTUATOR SYSTEMS

RELATED APPLICATIONS

Priority is claimed from U.S. Provisional Patent Application Ser. No. 60/377,927 filed on May 3, 2002, which is incorporated by reference in its entirety.

FIELD OF THE INVENTION

The present invention relates to digital storage devices and, more particularly, to actuator systems for hard disk drives.

BACKGROUND OF THE INVENTION

A disk drive is a digital data storage device that stores information on concentric tracks on a storage disk. The storage disk is coated on one or both of its primary surfaces with a magnetic material that is capable of changing its magnetic orientation in response to an applied magnetic field. During operation of a disk drive, the disk is rotated about a central axis at a constant rate. To read data from or write data to the disk, a magnetic transducer (or head) is positioned above (or below) a desired track of the disk while the disk is spinning.

Writing is performed by delivering a polarity-switching write current signal to the magnetic transducer while the transducer is positioned above (or below) the desired track. The write signal creates a variable magnetic field at a gap portion of the magnetic transducer that induces magnetically polarized transitions on the desired track. The magnetically polarized transitions are representative of the data being stored.

Reading is performed by sensing the magnetically polarized transitions on a track with the magnetic transducer. As the disk spins below (or above) the transducer, the magnetically polarized transitions on the track induce a varying magnetic field into the transducer. The transducer converts the varying magnetic field into a read signal that is delivered to a preamplifier and then to a read channel for appropriate processing. The read channel converts the read signal into a digital signal that is processed and then provided by a controller to a host computer system.

When data is to be written to or read from the disk, the transducer must be moved radially relative to the disk. In a seek mode, the transducer is moved radially inwardly or outwardly to arrange the transducer above a desired track. In an on-track mode, the transducer reads data from or writes data to the desired track. The tracks are typically not completely circular. Accordingly, in the on-track mode the transducer must be moved radially inwardly and outwardly to ensure that the transducer is in a proper position relative to the desired track. The movement of the transducer in on-track mode is referred to as track following.

Modern hard disk drives employ a dual-actuator system for moving the transducer radially relative to the disk. A first stage of a dual-actuator system is optimized for moving the transducer relatively large distances. A second stage of a dual-actuator system is optimized for moving the transducer relatively small distances. The present invention relates to hard disk drives having dual-stage actuator systems.

FIGS. 1 and 2 depict a mechanical portion of a disk drive 10. The disk drive 10 further comprises control electronics typically including a preamplifier, a read/write channel, a servo control unit, a random access memory (RAM), and read only memory (ROM), spindle motor, and dual-stage driving electronics. The electronic portion is or may be conventional and will not be described herein beyond what is necessary for a complete understanding of the present invention.

FIGS. 1 and 2 show that the mechanical portion of the disk drive 10 includes a disk 12 that is rotated by a spin motor 14. The spin motor 14 is mounted to a base plate 16. The disk drive 10 includes at least one and typically a plurality of disks 12, each with one or two recording surfaces. During use, the disk 12 is rotated about a spindle axis A.

The disk drive 10 further comprises what is commonly referred to as a head 18. The head 18 comprises or supports the magnetic read/write transducer described above; the head 18 will be referred to herein as the component of the disk drive 10 that reads data from and writes data to the disk 12.

FIGS. 1 and 2 further illustrate a positioning system 20 of the disk drive 10. The positioning system 20 comprises a bearing assembly 22 that supports at least one actuator arm assembly 24. The actuator arm assembly 24 supports the head 18 adjacent to one recording surface 26 of one of the disks 12. Typically, the bearing assembly 22 will support one actuator arm assembly 24 and associated head 18 adjacent to each of the recording surfaces 26 of each of the disks 12. The actuator arm assemblies 24 allow each head 18 to be moved as necessary to seek to a desired track 28 in seek mode and then follow the desired track 28 in track following mode.

The positioning system 20 depicted in FIGS. 1 and 2 is a dual-stage system. Accordingly, each actuator arm assembly 24 comprises a first actuator structure 30 and a second actuator structure 32. For ease of illustration, FIGS. 1 and 2 depict the first and second actuator structures 30 and 32 as comprising first and second elongate actuator arms 34 and 36, respectively, and the actuator structures 30 and 32 may be implemented as shown in FIGS. 1 and 2.

The actuator structures 30 and 32 may, however, be implemented using other structures or combinations of structures. For example, the first actuator structure 30 may comprise an elongate arm that rotates about a first axis B, while the second actuator structure 32 may comprise a suspension assembly rigidly connected to a distal end of the first actuator. In this case, the first actuator is able to rotate about an actuator axis, while the head 18 would be suspended from the second actuator for linear movement along the disk radius relative to the position of the first actuator. The actuator structures 30 and 32 may thus take any number of physical forms, and the scope of the present invention should not be limited to the exemplary actuator structures 30 and 32 depicted in FIGS. 1 and 2.

Conventionally, the bearing assembly 22 is also considered part of the first actuator structure 30. In particular, the bearing assembly 22 supports a proximal end 40 of the first actuator arm 34 for rotation about a first axis B, while a distal end 42 of the first actuator arm 34 supports a proximal end 44 of the second actuator arm 36 for rotation about a second axis C. In this case, the head 18 is supported on a distal end 46 of the second actuator arm 36.

FIG. 2 also illustrates that the exemplary actuator structures 30 and 32 of the positioning system 20 form part of a first actuator 50 and a second actuator 52. For the purposes of the following discussion, the first actuator 50 is identified as a voice coil motor (VCM) and the second actuator 52 is identified as a piezoelectric transducer (PZT). However, the actuators 50 and 52 may be formed by any device capable of moving based on an electrical control signal as will be described below.

In particular, based on a first actuator control signal, the first actuator 50 moves the first actuator arm 34 to change an angular position of the head 18 relative to the first axis B. The second actuator 52 is supported by the distal end 42 of the first actuator structure 30 to rotate the head 18 about the second axis C based on a second actuator control signal. In FIG. 2, an angular position of the first actuator arm 34 is represented by reference character D, while an angular position of the second actuator arm 36 is represented by reference character E.

A range of movement "S" associated with the second actuator structure 32 is defined by the stroke "s+" and "s−" in either direction relative to a neutral position D defined by the first actuator arm 34. The term "actual displacement" (ds in FIG. 2) refers to the angular difference at any point in time of the head 18 relative to the neutral position as defined by the position D of the first actuator structure 30. When the head 18 is in the neutral position, the actual displacement of the second actuator arm 36 is zero.

FIG. 2 further identifies arbitrary first and second tracks 28a and 28b on the disk 12. The actuator arm assembly 24 is shown in an initial position by solid lines and in a target position by broken lines; the first track 28a will thus be referred to as the "initial track" and the second track 28b will be referred to as the "target track". It should be understood that the terms "initial track" and "target track" are relative to the position of the head 18 before and after a seek operation. Any track 28 on the disk 12 may be considered the initial track or the target track depending upon the state of the disk drive 10 before and after a particular seek operation.

FIG. 3 contains a block diagram of a servo system 60 incorporating a conventional two-stage actuator system. The servo system 60 will typically be embodied as a software program running on a digital signal processor, but one of ordinary skill in the art will recognize that control systems such as the servo system 60 described herein could be implemented in hardware.

The servo system 60 comprises a first stage 62 and a second stage 64. As described above, the disk 12 defines a plurality of tracks 28 in the form of generally concentric circles centered about a spindle axis C. The first stage 62 controls the VCM 50 and the second stage 64 controls the PZT 52 to support the head 18 adjacent to a desired one of the tracks 28. The first and second actuator control signals are generated as part of this larger servo system 60.

More specifically, an input signal "R" is combined with a position error signal "PES" by a first summer 70. The second stage position signal $Y_2$ is indicative of an actual position of the actuator 52 of the second stage 64, and a second stage position estimate signal "$Y_{2est}$" is indicative of an estimated position of the actuator 52 of the second stage 64. The second summer 72 combines the second stage position estimate signal "$Y_{2est}$" and the output of the first summer 70. A first stage position signal "$Y_1$" is indicative of the actual position of the first actuator 50 of the first stage 62. A third summer 74 combines the first and second stage position signals "$Y_1$" and "$Y_2$". System disturbances "d" are represented as an input to the third summer 74. The position error signal "PES" thus represents the combination of the first and second position signals "$Y_1$" and "$Y_2$" with any system disturbances "d".

The source of the input signal "R" and the first and second stage position signals "Yi" and "$Y_2$" is or may be conventional and will be described herein only to the extent necessary for a complete understanding of the present invention. Briefly, each of the tracks 66 contains data sectors containing stored data and servo sectors containing servo data. The servo data identifies each individual track 66 to assist in seek operations and is also configured to allow adjustment of the radial position of the head 18 during track following. As is conventional, a servo demodulation unit generates the position error signal "PES" and the first and second stage position signals "$Y_1$" and "$Y_2$" based on the servo data read from the disk 12. The input signal "R" is generated by a host computer or is simply zero during track following.

Referring now back to the servo system 60, the frequency response of the first stage 62 may be different from that of the second stage 64. For example, the process of manufacturing a second actuator 52 using PZT technology typically results in the second stage 64 having a wider gain distribution than the first stage 62 using VCM technology. The overall bandwidth of the system 60 is thus determined by the wider bandwidth associated with the second stage 64. The gain variation of the second stage 64 thus directly affects the bandwidth and stability margins of the entire system 60. The need thus exists to calibrate the gain of the second stage 64 to improve system bandwidth and stability margins.

In addition, the second stage 64 may drive the exemplary PZT actuator 52 using a voltage driver instead of a charge driver. An actuator using a voltage driver is susceptible to gain drifts with changing temperatures. The need thus further exists for a gain calibration system for the second stage 64 to compensate for such temperature related gain variations.

Gain calibration of the second stage 64 generally requires knowledge of how a particular second transducer responds to a known input signal. The Applicants are aware of several calibration methods that have been proposed for calibrating the gain of the second stage 64 of the hard drive dual stage actuator.

The first calibration method is to perform complete open loop acceleration/deceleration of the second stage actuator structure 32. This method is similar to the process used to calibrate the first stage actuator structure 30. The stroke ("s+") of the second stage actuator structure 32 is, however, relatively limited, typically on the order of approximately 1 $\mu$m. With disturbances "d" commonly on the order of tens of tracks, the motion of the second stage actuator structure 32 can be buried in the noise. This technique thus does not work well when applied to the second stage actuator structure 32 of a hard disk drive.

The second calibration method is to introduce a single frequency point DFT into the second stage 64. This second approach can be implemented with a single stage servo (the first stage loop closed) or with a dual-stage servo (both loops closed). The block diagram of the servo system 60 is modified as shown in FIG. 4 when this calibration method is used. As shown in FIG. 4, the first stage 62 comprises a first stage controller 80 and the first stage actuator 50. The second stage 64 comprises a second stage controller 82, an estimator circuit 84, a notch filter 86, and the second stage actuator 52. The first and second stage controllers 80 and 82 are thus conventionally considered part of the servo system 60. During calibration an excitation signal $\mu A_{in}$ is input to the notch filter 86 instead of the output of the second stage controller 82.

Because the motion of the second stage actuator structure 32 cannot be directly measured, the second stage response is calculated according to one of the following formulas (1) or (2). In particular, if the second stage controller 82 is inactive, the second stage response is calculated according to the following formula (1):

$$\frac{PES(j\omega)}{\mu A_{in}(j\omega) \cdot ETF_{VCM}(j\omega)} \quad (1)$$

If the second stage controller 82 is active, the second stage response is calculated according to the following formula (2):

$$\frac{PES(j\omega)}{\mu A_{in}(j\omega) \cdot ETF_{Dual-stage}(j\omega)} \quad (2)$$

During application of these formulas (1) and (2) to calibrate the DC gain, ω is typically chosen from the range of between approximately 100 Hz and 500 Hz. Of these two formulas, formula (2) is less frequently used than formula (1) because, if the gain is way off the nominal value, the dual-stage servo may not be able to stay on track.

Both of these formulas (1) or (2) use the error transfer function (ETF) of the servo loop as the devisor and thus require measurement of the error transfer function. The process of measuring the error transfer function complicates implementation of the servo system 60 and increases the likelihood that the calibration will be inaccurate.

Even if the nominal VCM plant is used and it is assumed that, at low frequencies, the gain variation of the VCM is negligible, this second calibration approach is still susceptible to the problem of low coherence. As shown in formulas (1) and (2), the second stage 64 is filtered by the error transfer function, which has high attenuation at low frequencies. The maximum stroke ("s+") of the second stage actuator structure 32 is on the order of approximately 1 μm, and is even lower if a low voltage driver is used for cost reduction purposes. Accordingly, when the excitation signal eventually shows up in the "PES", the excitation signal has been substantially attenuated. In practice, attenuation by the error transfer function adds approximately 1 dB of measurement inconsistency beyond the error introduced by the process of measuring the error transfer function.

A need thus exists for improved positioning systems and methods for a dual-stage actuator of a disk drive and, in particular, for improved calibration systems and methods for the second stage of such positioning systems and methods.

SUMMARY OF THE INVENTION

The present invention may be embodied as a servo system for displacing a head relative to a disk of a hard drive. The servo system comprises a dual-stage actuator, a calibration signal generator, and a calibration factor generator. The calibration signal generator generates a calibration signal having a calibration portion. The calibration factor generator generates a calibration factor. The servo system operates in operating and calibration servo modes. In the operating mode, the system defines first and second servo loops. The calibration factor is used as one of the parameters of the second servo loop. In the calibration servo mode, the calibration signal forms the second control signal, and the calibration factor generator generates the calibration factor based on movement of the head before any substantial response of the third servo loop to the calibration portion.

The present invention may also be implemented as a method of calibrating the second stage of a dual-stage actuator. In one embodiment, the method may comprise the following steps. The head is displaced relative to the disk based on first and second servo loops incorporating the first and second stages of the dual-stage actuator. The second stage of the dual-stage actuator is corrected based on a calibration factor. A calibration signal having at least one calibration portion is generated. A third servo loop incorporating the first stage of the dual-stage actuator system is formed. The calibration signal is applied to the second stage of the dual-stage actuator system. The calibration factor is generated based on movement of the head in response to the calibration signal before any substantial response by the third servo loop to the calibration portion of the calibration signal.

BRIEF DESCRIPTION OF THE DRAWINGS

FIG. 7 is a graph plotting illustrating a time relationship between an exemplary calibration signal and a position error signal excited by the exemplary calibration signal;

FIGS. 8A and 8B contain a bode plot associated with a dual-stage actuator system in which the second stage has not been calibrated using the principles of the present invention.

DETAILED DESCRIPTION OF THE PREFERRED EMBODIMENT

Figure 1:
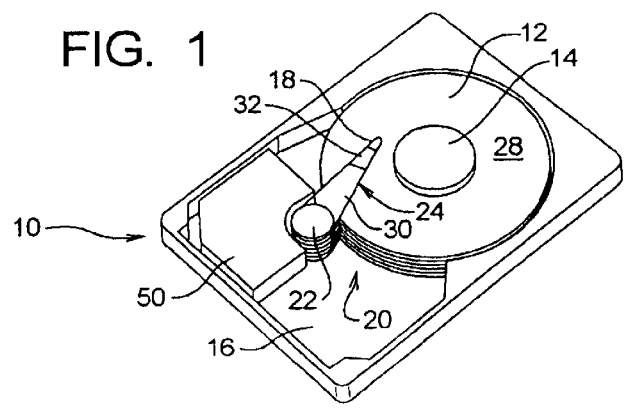
FIG. 1 is a perspective view of a mechanical portion of a hard disk drive.
Figure 2:
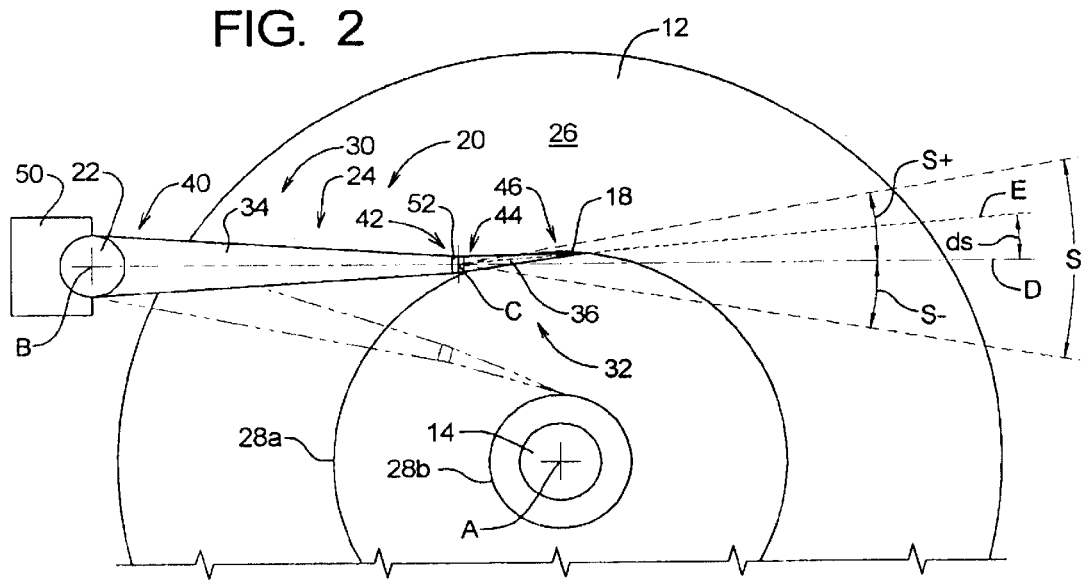
FIG. 2 is a schematic representation of some components of the mechanical portion of the disk drive of FIG. 1.
Figure 3:
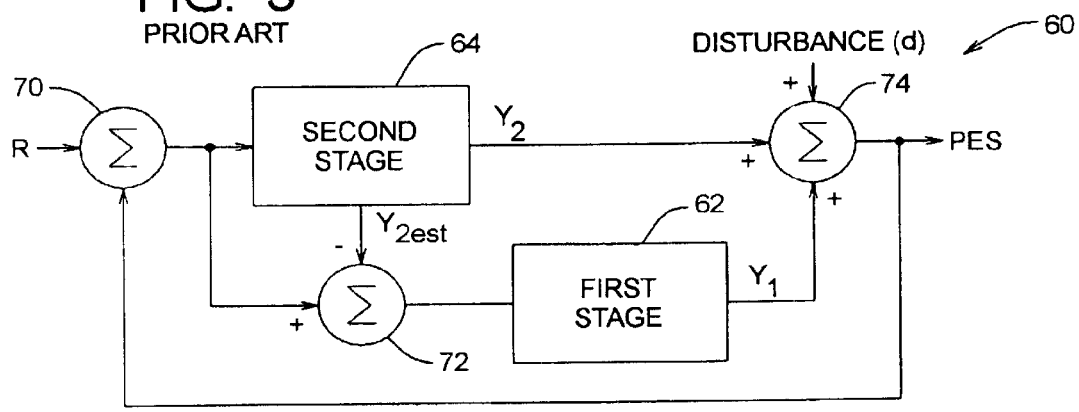
FIG. 3 is a block diagram depicting a control system used by a prior art servo system for a dual-stage actuator of a hard disk drive.
Figure 4:
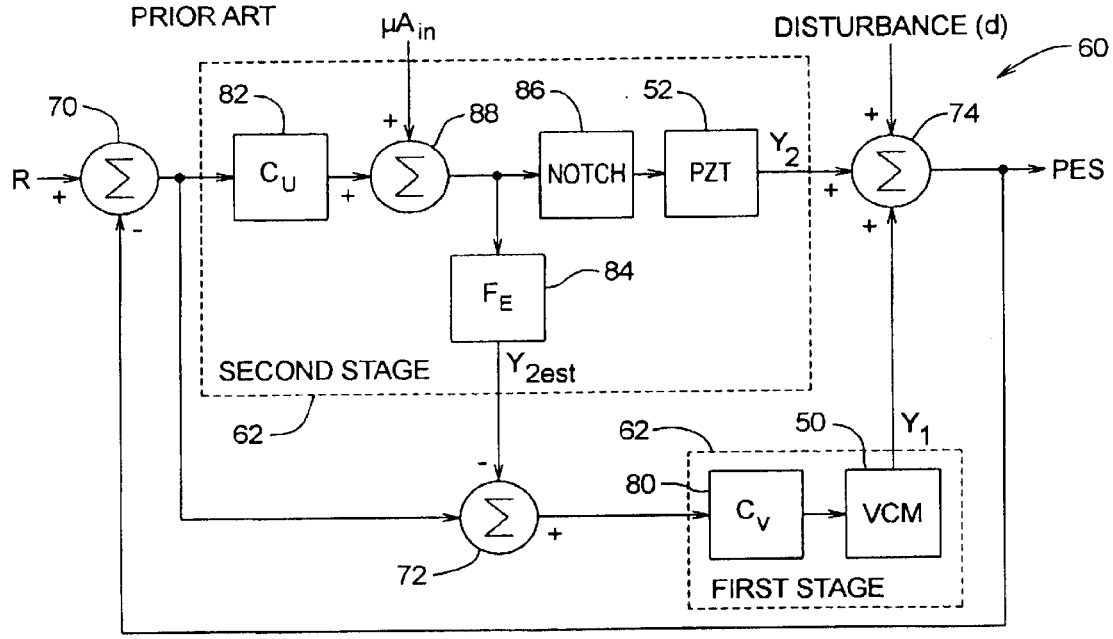
FIG. 4 is a block diagram depicting a prior art calibration scheme for calibrating a second stage of a dual-stage actuator of a hard disk drive.
Figure 5:
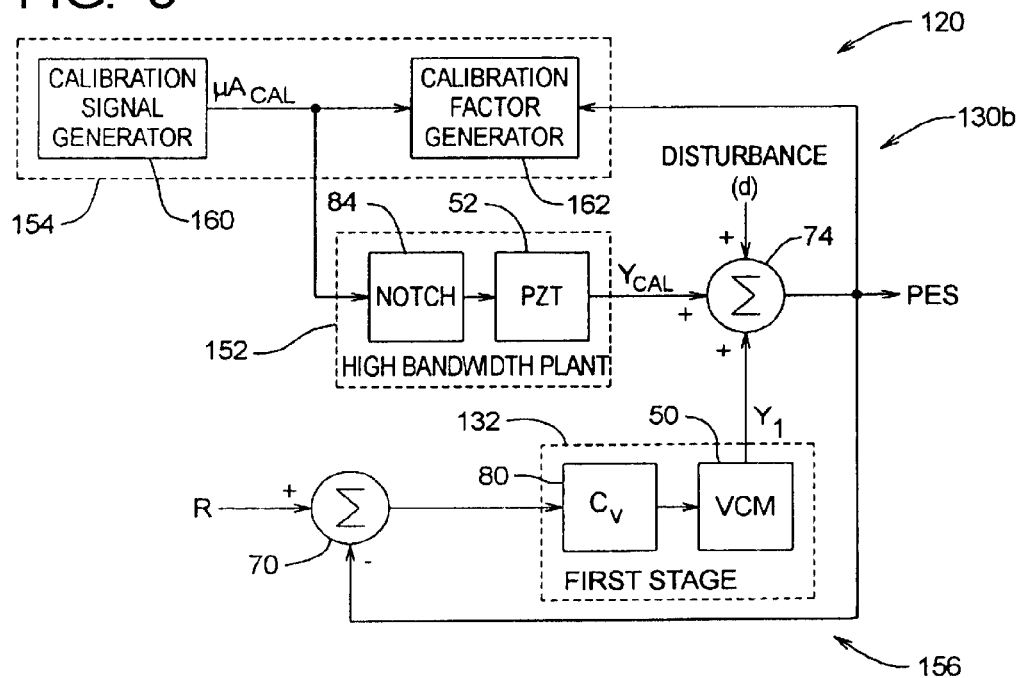
FIG. 5 is a block diagram depicting a servo system of the present invention in a calibration servo mode.
Figure 6:
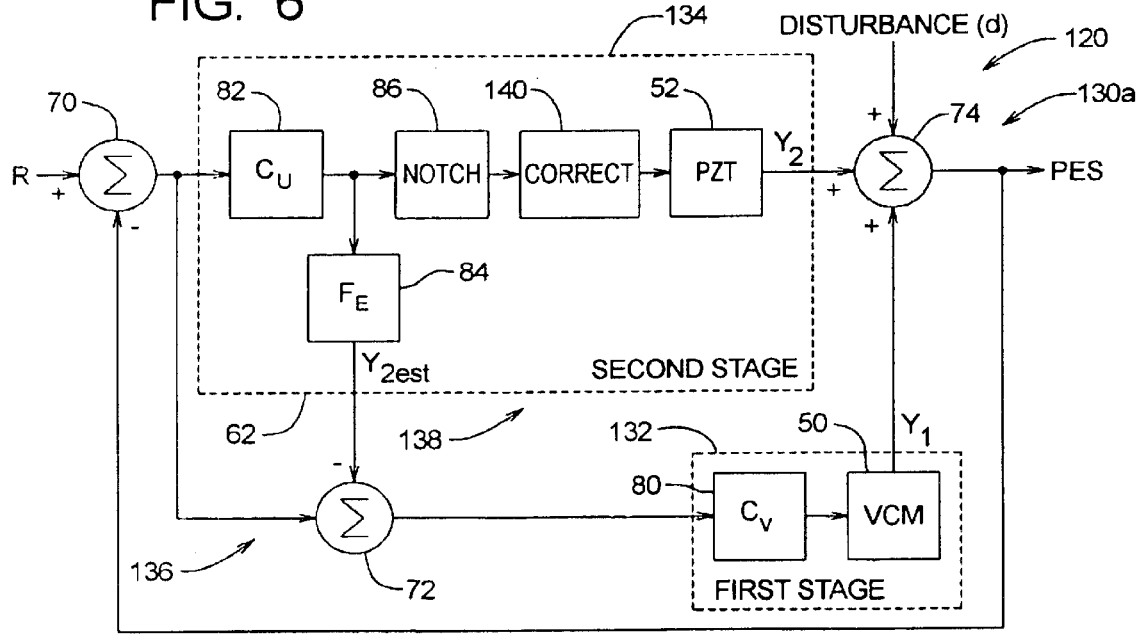
FIG. 6 is a block diagram depicting a servo system of the present invention in an operation mode.

Referring now to FIGS. 5 and 6 of the drawing, depicted therein is a servo system 120 constructed in accordance with, and embodying, the principles of the present invention. The exemplary servo system 120 operates in a read/write servo (operating) mode 130a as shown in FIG. 6 and a calibration servo mode 130b as shown in FIG. 5.

In both the calibration servo mode 130b and the read/write servo mode 130a, the servo system 120 comprises an actuator system comprising the first and second actuator structures 30 and 32 and first and second actuators 50 and 52 described above. As will be described in detail below, the servo system 120 further generates the first and second actuator control signals that cause the actuators 50 and 52 to move the actuator structures 30 and 32.

As shown in FIG. 6, when in the read/write servo mode 130a, the servo system 120 is configured to define a dual-stage servo system. The servo system 120 will typically be embodied as a software program running on a digital signal processor, but one of ordinary skill in the art will recognize that the servo system 120 described herein could be implemented in hardware.

In the read/write servo mode 130a, the servo system 120 comprises first and second stages 132 and 134 forming first and second servo loops 136 and 138 and the first, second, and third summers 70, 72, and 74 as generally described above.

The first stage 132, like the first stage 62 described above, comprises the first controller 80 and the first actuator 50. The second stage 134 is similar to the second stage 64 described above in that it comprises the second controller 82, the estimator 84, the notch filter 86, and the second actuator 52. When in the operating mode depicted in FIG. 6, the servo system 120 may be used in a generally conventional manner to allow the hard disk drive 10 to perform seek and track following processes.

The primary difference between the operation of the control system 130a and the servo system 60 described above is in the operation of the second stage 134 of the servo system 120 in the read/write servo mode 130a. In particular, a correction block 140 is arranged between the output of notch filter 86 and the input of the actuator 52 of the second stage 134. The correction block 140 alters the parameters of the system 120 based on a calibration factor. For example, the correction block 140 may multiply the output of the notch filter 86 by a constant (e.g., "1") when no calibration is required, and this constant is modified (e.g., "1.5") based on the calibration factor as required. When the output of the notch filter 86 is modified using the correction factor, the gain of the second stage 134 is calibrated, and the bandwidth and stability of the servo system 120 are significantly improved as will be described in detail below.

The calibration factor used by the correction signal generator 140 is calculated by the servo system 120 operating in the calibration servo mode 130b, as will now be described with reference to FIG. 6.

In the calibration servo mode 130b, the servo system 120 comprises the first stage 132 and a high bandwidth plant 152. The high bandwidth plant 152 comprises the notch filter 86 and second actuator 52. In addition, the servo system 120 further comprises a calibration system 154. When the servo system 120 enters the calibration servo mode 130b, the correction factor is set to a default value (e.g., "1") effectively eliminating the correction block 140 from the high bandwidth plant 152 as shown in FIG. 6.

In the calibration servo mode 130b, the third summer 74 combines the output "$Y_1$" of the first stage 132 with an output "$Y_{CAL}$" of the high bandwidth plant 152 to obtain the signal "PES". The first summer 70 adds the "PES" signal to the input signal "R", and the output of the first summer 70 is used as the input to the first controller 80. The first stage 132 thus defines a third servo loop 156.

The parameters of the third servo loop 156 are similar to those of the first servo loop 136 when the servo system 120 is in the operating mode, but the output "$Y_{2EST}$" of the estimator 84 is not an input of the servo loop 156. Accordingly, the servo loop 156 incorporating the first stage 132 is similar to, and uses some of the same components as, the first servo loop 136 formed by the first stage 132 of the servo system 120 in the read/write mode 103a. However, because these loops 136 and 156 are not identical, and the term "third servo loop" is used herein to distinguish the servo loop 156 from the servo loop 136.

The calibration system 154 comprises a calibration signal generator 160 and a calibration factor generator 162. The calibration signal generator 160 generates a calibration signal "$\mu A_{CAL}$" that is applied to the input of the high bandwidth plant 152 formed by the notch filter 86 and the second actuator 52. The output "$Y_{CAL}$" of the high bandwidth plant 152 is thus the response of the plant 152 to the calibration signal "$\mu A_{CAL}$" generated by the calibration signal generator 160.

The parameters of the calibration signal "$\mu A_{CAL}$" are selected to cause the second actuator 52 to move the head 18 relative to the disk 12 without generating any substantial response by the first stage 132. The movement of the head 18 relative to the disk 12 is detected by the calibration factor generator 162 as a change in the position error signal "PES". Because the calibration signal "$\mu A_{CAL}$" does not initially generate a substantial response from the first stage 132, the change in the position error signal "PES" can be assumed to be solely or at least substantially a product of the high bandwidth plant 152 formed by the notch filter 86 and second actuator 52 in response to the calibration signal "$\mu A_{CAL}$".

The calibration factor generator 162 thus generates the calibration factor based on the movement of the head as reflected by the change in the position error signal "PES". More specifically, the calibration factor is generated based on the relationship between the known calibration signal "$\mu A_{CAL}$" and the change in the position error signal "PES".

Referring now to FIG. 7, the graph depicted therein illustrates the relationship between the calibration signal "$\mu_{CAL}$" and the position error signal "PES" for a servo system incorporating the principles of the present invention operating in the calibration servo mode 130b. In FIG. 7, the exemplary position error signal "PES" is identified by reference character 220, and the calibration signal "$\mu A_{CAL}$" is identified by reference character 222.

The x-axis of the graph of FIG. 7 is labeled "Sample" and represents the number of samples of the position error signal starting from a zero point, with the number of samples corresponding to time beginning at the zero point based on the sampling rate. The y-axis is labeled "Counts" and represents the magnitude of the position error signal. FIG. 7 is primarily intended to illustrate the time relationship between the position error signal 220 and the calibration signal 222 and does not necessarily represent the magnitude relationship between these signals.

As shown in FIG. 7, the exemplary calibration signal 222 is a square wave having a duty cycle of approximately fifty percent and a period of approximately 400 samples. The calibration signal 222 creates a series of positive and negative disturbance portions at each transition of the square wave. Positive disturbance portions are shown at 230 in FIG. 7, while a negative disturbance portion is shown at 232 in FIG. 7. In terms of the graph of FIG. 7, the positive step disturbances 230 occur at samples "100" and "500" while the negative step disturbance 232 occurs at sample "300". The calibration signal 222 may, however, repeat for many more cycles than can be shown in FIG. 7.

In the servo system 120, these disturbance portions 230 and 232 are ideally step disturbances. In practice, the calibration signal generator 160 will generate the calibration signal 222 to be as close as possible to an ideal step disturbance, but the calibration will typically be an approximation of a step disturbance. In any event, at the disturbance portions 230 and 232, the calibration signal 222 should have a slope that allows the calibration signal 222 to reach its maximum value before the first stage 132 can respond in any substantial manner to the calibration signal 222.

In response to each of the positive step disturbances 230, the position error signal 220 reacts with short term positive spikes 240. The position error signal 220 similarly reacts with short term negative spikes 242 in response to the negative step disturbances 232. These spikes 240 and 242 fall within measurement periods 250 and 252 that occur immediately following each of the step disturbances 230 and 232. In terms of the graph of FIG. 7, the measurement periods 250 occur in ranges between samples "100" and "105" and between samples "500" and "505". The measurement period 252 occurs in a range between samples "300" and "305". The change in the position error signal 220 during these measurement periods 250 and 252 is due almost entirely to the reaction of the high bandwidth plant 152.

As described above, the spikes 240 and 242 occur before any substantial response by the first stage 132 to the calibration signal 222. In the context of the present invention, the term "substantial response" indicates that the first stage 132 contributes no more than 25% of the position error signal 220 in a first range, no more than 15% of the position error signal in a second range, and preferably less than 5% of the position error signal in a third range. Stated another way, the parameters of the third loop 156 formed by the first stage 132 will determine a reaction period in which first stage 132 will respond to the disturbance portions 230 and 232. The term "before any substantial response" refers to the disturbance portions 230 and 232 reaching a maximum level within a time period less than (including a safety margin) the reaction period of the first stage 132. In any event, the contribution of the first stage 132 to the reaction of the position error signal 222 within the measurement periods 250 and 252 decreases the effectiveness of the calibration factor, so this contribution should be kept to a minimum.

The value of at least one of the samples of the position error signal 220 that occurs during these measurement periods 250 and 252 is stored as a representation of the movement of the head 18 caused by the reaction of the high bandwidth plant 152 to the calibration signal 222. The calibration process of the present invention may be implemented using a single sample value of the position error signal 220 taken during one of the measurement periods 250 and 252.

However, the accuracy of the calibration process may be improved by storing at least one sample value, and preferably two or more sample values, during each of the measurement periods 250 and 252. These sample values may be averaged for each measurement period and/or for a plurality of such measurement periods to obtain an average sample value.

In addition, each sample value may be compared with reasonableness criteria such as other sample values taken during a particular calibration process or with predetermined reference values or allowable ranges of reference values. Sample values that do not meet the reasonableness criteria may be discarded and not used during the calibration process. If an unusually large number of sample values do not meet the reasonableness criteria, the system may conclude that the high bandwidth plant 152 is not working properly and take or suggest corrective action.

Decay periods 260 and 262 follow each of these spikes 240 and 242.

In the example shown in FIG. 7, the decay period 260 occurs in a range between samples "105" and "300", while the decay period 262 occurs in a range between samples "305" and "500".

During the decay periods 260 and 262, the servo reaction of the first stage 132 returns the position error signal 220 to zero, or at least to within a steady state range of values near zero. The steady state range is illustrated by reference character 270 in FIG. 7. In the exemplary servo system 120, the steady state range is on the order of plus or minus 50 counts. In any event, the relationship between the steady state range 270 and the maximum value of the position error signal 220 during the spikes 240 and 242 should be chosen such that any offset of the head 18 prior to the measurement period is inconsequential. Typically, the steady state range will be selected to be on the order of approximately three to five percent, and preferably no more than ten percent, of the maximum value of the position error signal 220 during the spikes 240 and 242.

The step disturbances 230 and 232 are thus spaced from each other in time to allow the servo reaction of the first stage 132 to return the position error signal 220 to zero or near zero before the next step disturbance. Accordingly, the period of the calibration signal 222 is predetermined to allow large transients caused by reaction of the first stage servo 150 to one step disturbance to substantially subside or die down before the next step disturbance is introduced.

The present invention may be implemented with calibration signals having characteristics that differ from the exemplary calibration signal 222 described herein. The period of the square wave may be predetermined to be shorter or longer given the characteristics of a particular actuator system. Alternatively, instead of using a square wave, the calibration signal may be formed by a rectangular wave with an offset duty cycle that results in the calibration signal comprising a series of pulses spaced in time. As another example, the calibration signal need not be periodic: a calibration signal comprising a single discrete step disturbance, a single calibration pulse, or limited number of such disturbances or pulses may be used. The calibration signal may start at a zero value and increase or decrease at each step disturbance from zero, or the calibration signal may be centered about the zero value.

The servo system 120 normally operates in the read/write servo mode 130a described above. The servo system 120 may be placed in the calibration servo mode 130b randomly, periodically, or asynchronously based on system conditions. For example, the servo system 120 may be placed in the calibration servo mode 130b during times when the hard disk drive 10 is idle, immediately prior to read/write operations, and/or any time system performance suggests that calibration is required.

Figure 8B:
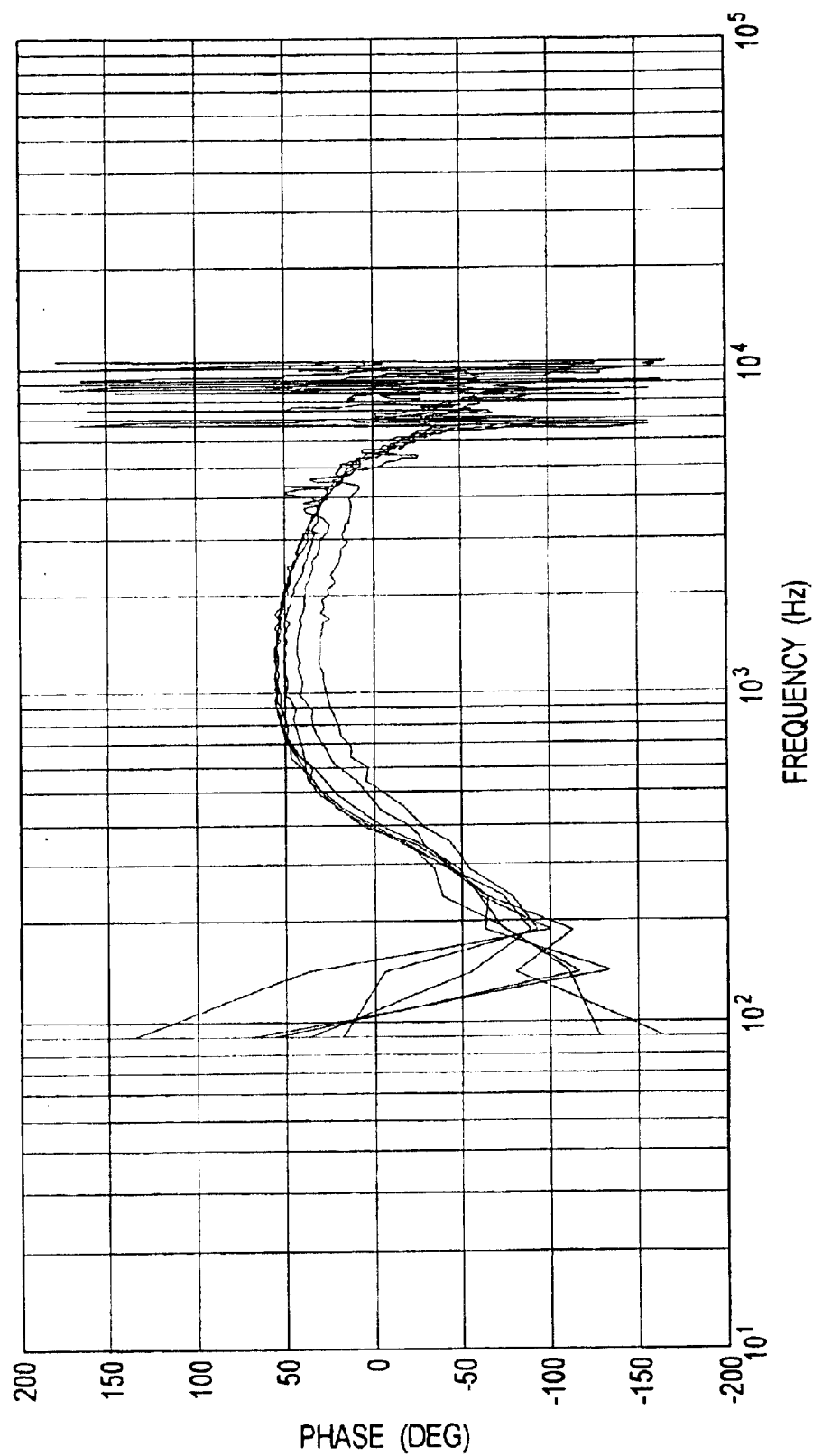
Figure 9A:
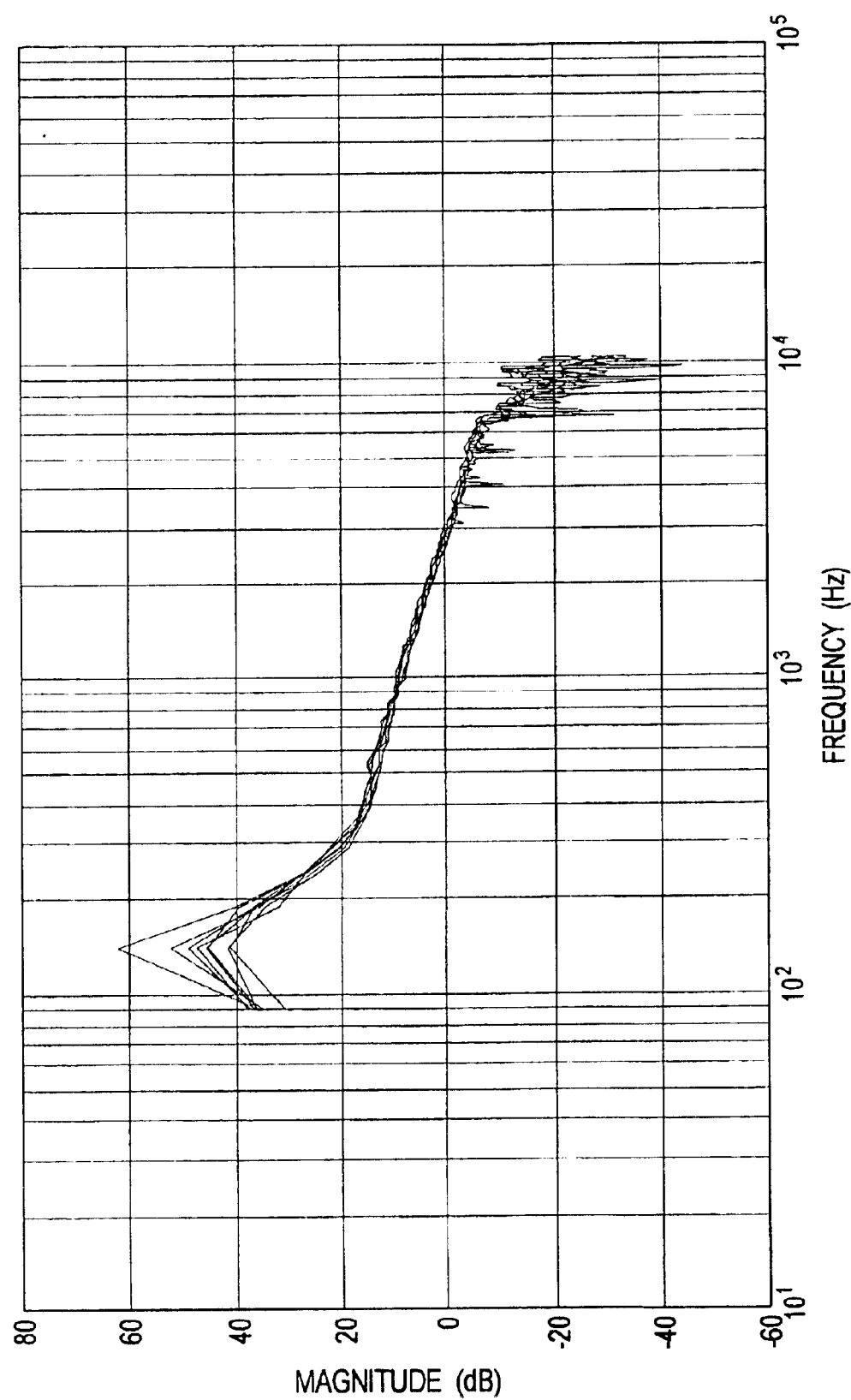
FIGS. 9A and 9B contain a bode plot associated with a dual-stage actuator system calibrated using the principles of the present invention.
Figure 9B:
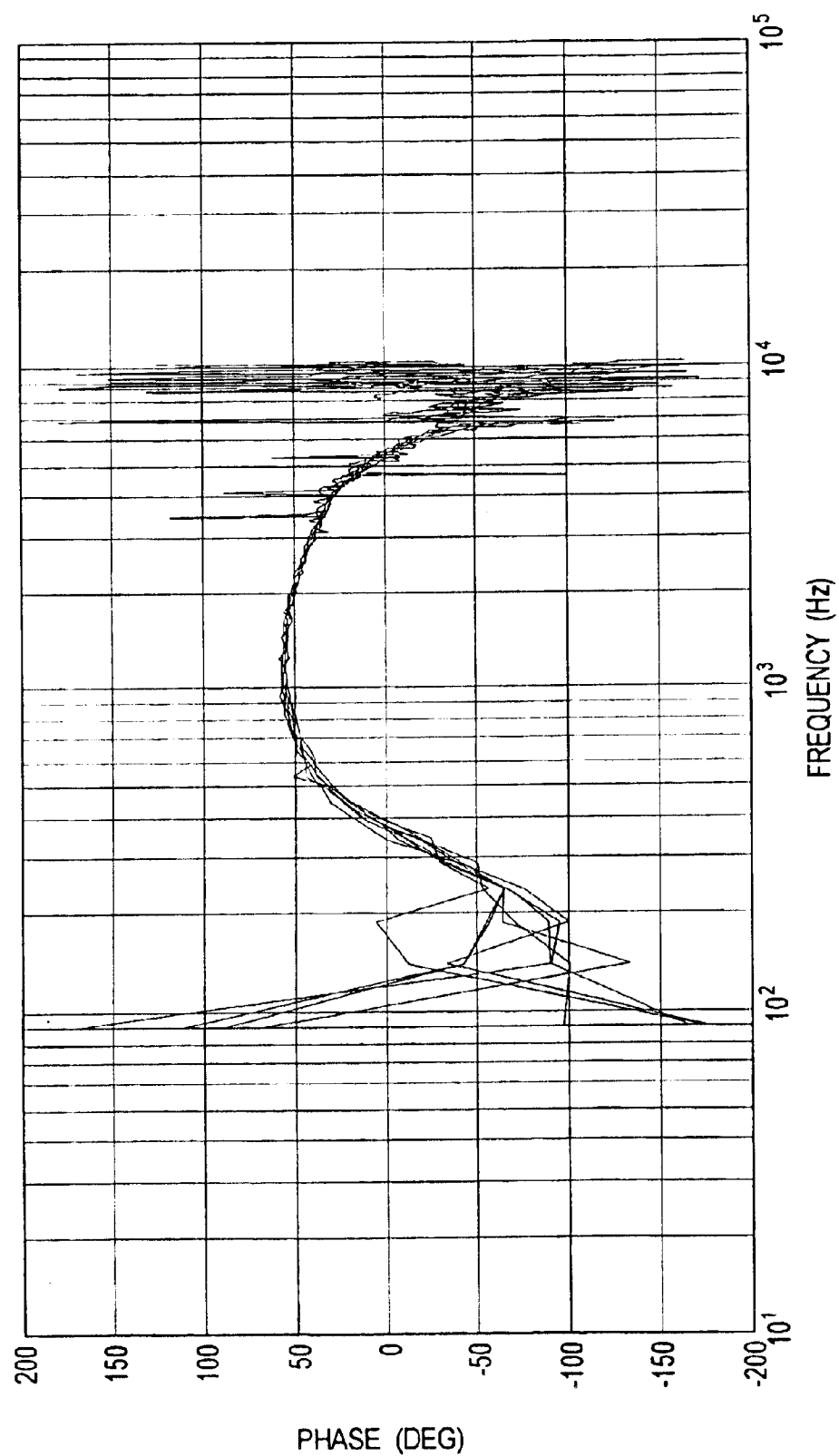

The effects of the present invention are illustrated by a comparison of FIGS. 8A and 8B with FIGS. 9A and 9B, respectively. In particular, FIGS. 8A and 8B are bode plots taken from eight dual stage drives without calibration. FIGS. 9A and 9B are bode plots taken from the same eight dual stage drives with calibration.

FIG. 8A shows that the gain variation is as much as 6 dB and that the bandwidth variation is within a range of approximately 1.34 kHz to 2.94 KHz. FIG. 8B illustrates that the phase distribution of the un-calibrated system is as much as 30°. FIGS. 8A and 8B illustrate that, unlike overall loop gain, the gain variation caused by an un-calibrated second stage 64 not only affects magnitude but also phase. In some cases, the drop of bandwidth due to the reduced second stage gain also yields worse phase margins.

In contrast, FIGS. 9A and 9B show a much tighter distribution in both magnitude and phase. The open loop gain variation after calibration is approximately 1.5 dB and the bandwidth distribution is within a range of approximately 2.64 kHz to 3.09 kHz. The servo system 120 of the present invention may be embodied in many forms without departing from the spirit thereof. For example, the exemplary control system 130a comprises a correction signal generator 140 and a summer 142 to correct the output of the second stage 134 based on the calibration factor generated during the calibration servo mode 130b. The calibration factor may be used to correct the output of the second stage 134 using alternative circuitry, however, and the scope of the present invention should not be limited to the example shown herein.

Any particular embodiment of the present invention may exhibit one or more of the following advantages. First, the calibration process is a simple process that occurs within a short time frame that can be implemented substantially in real-time. Second, the calibration process tightens up bandwidth and margin distribution, thus increasing the accuracy of the servo system. Third, the calibration process can be implemented in a manner that indicates failure of the second stage. Fourth, the calibration process may be implemented without significant acoustic impact.

The scope of the present invention should thus be determined with respect to the following claims and not the foregoing detailed description.

We claim:

1. A servo system for displacing a head relative to a disk of a hard disk drive, comprising:
    a dual-stage actuator system for moving the head relative to the disk in response to first and second control signals;
    a calibration signal generator for generating a calibration signal having at least one calibration portion; and
    a calibration factor generator for generating a calibration factor; whereby
    the servo system operates in an operating mode in which the first control signal is generated as part of a first servo loop and the second control signal is generated as part of a second servo loop, where the calibration factor is used as one of the parameters of the second servo loop; and
    the servo system operates in a calibration servo mode in which the first control signal is generated as part of a third servo loop, the calibration signal forms the second control signal, and the calibration factor generator generates the calibration factor based on movement of the head before any substantial response by the third servo loop to the at least one calibration portion of the calibration signal.

2. A servo system as recited in claim 1, in which the calibration signal comprises a plurality of calibration portions.

3. A servo system as recited in claim 1, in which the at least one calibration portion is a step disturbance.

4. A servo system as recited in claim 1, in which the second servo loop has a wider gain distribution than that of the first servo loop.

5. A servo system as recited in claim 1, in which the calibration signal comprises a plurality of step disturbances.

6. A servo system as recited in claim 1, in which:
    the third servo loop begins to respond to the calibration portion of the calibration signal after a measurement period; and
    the calibration factor generator generates the calibration factor during the measurement period.

7. A servo system as recited in claim 2, in which:
    the third servo loop responds to the calibration portions of the calibration signal during a decay period beginning after a measurement period;
    the calibration factor generator generates the calibration factor during the measurement period; and
    a duration of the decay period allows a response of the third servo loop to the calibration portions of the calibration signal to decay.

8. A servo system as recited in claim 7, in which:
    the calibration factor generator generates the calibration factor at least in part based on a position error signal indicative of a position of the head relative to the disk; and
    the duration of the decay period is predetermined to allow the position error signal to return to a steady state range.

9. A servo system as recited in claim 1, in which the calibration factor generator generates the calibration factor at least in part based on a position error signal indicative of a position of the head relative to the disk.

10. A servo system as recited in claim 1, in which the calibration factor generator generates the calibration factor at least in part based on a plurality of samples of a position error signal indicative of a position of the head relative to the disk.

11. A servo system as recited in claim 10, in which the calibration factor generator generates the calibration factor at least in part based on an average of the plurality of samples of the error position signal.

12. A servo system as recited in claim 10, in which the calibration factor generator generates the calibration factor based on a subset of the plurality of samples of the position error signal.

13. A servo system as recited in claim 12, in which the calibration factor generator generates the calibration factor based on only those samples of the position error signal meeting predetermined reasonableness criteria.

14. A servo system as recited in claim 10, in which the calibration factor generator signals that a fault condition exists based on samples of the position error signal.

15. A servo system as recited in claim 14, in which the calibration factor generator signals that the fault condition exists when a predetermined number of samples of the position error signal do not meet predetermined reasonableness criteria.

16. A servo system as recited in claim 1, in which the calibration signal is a rectangular wave.

17. A servo system as recited in claim 16, in which the calibration portions of the calibration signal are the transitions of the calibration signal from low to high and high to low.

18. A servo system as recited in claim 16, in which the calibration signal has a duty cycle of approximately fifty percent.

19. A servo system as recited in claim 16, in which the period of the calibration signal is predetermined based on response characteristics of the third servo loop.

20. A servo system as recited in claim 16, in which the period of the calibration signal is predetermined to allow a position error signal indicative of a position of the head relative to the disk to return to a steady state range.

21. A servo system for displacing a head relative to a disk of a hard disk drive, comprising:
    an actuator system comprising
        a first actuator supported for movement along a radius of the disk,
        a first transducer for converting a first control signal into movement of the first actuator,
        a second actuator that movably supports the head relative to the first actuator, and a second transducer for converting a second control signal into movement of the head relative to the first actuator;

a calibration system comprising
a calibration signal generator for generating a calibration signal having at least one calibration portion,
a calibration factor generator for generating a calibration factor, and
a correction signal generator for generating a correction signal based on the calibration factor; whereby the servo system operates in
an operating mode in which
the first control signal is generated by a first servo loop incorporating the first transducer and the first actuator; and
the second control signal is generated by a second servo loop incorporating the second transducer and the second actuator, where the correction signal corrects the second control signal; and
a calibration servo mode in which
the first control signal is generated as part of a third servo loop incorporating the first transducer,
the second control signal is the calibration signal, and
the calibration factor generator generates the calibration factor based on movement of the head, as indicated by a change of a position error signal indicative of a position of the head relative to the disk, before any substantial response by the third servo loop to the calibration portion of the calibration signal.

22. A servo system as recited in claim 21, in which the calibration signal comprises a plurality of calibration portions.

23. A servo system as recited in claim 21, in which the at least one calibration portion is a step disturbance.

24. A servo system as recited in claim 21, in which the second servo loop has a wider gain distribution than that of the first servo loop.

25. A servo system as recited in claim 21, in which the calibration signal comprises a plurality of step disturbances.

26. A servo system as recited in claim 21, in which:
the third servo loop begins to respond to the calibration portion of the calibration signal after a measurement period; and
the calibration factor generator generates the calibration factor during the measurement period.

27. A servo system as recited in claim 22, in which:
the third servo loop responds to the calibration portions of the calibration signal during a decay period beginning after a measurement period;
the calibration factor generator generates the calibration factor during the measurement period; and
a duration of the decay period allows a response of the third servo loop to the calibration portions of the calibration signal to decay.

28. A servo system as recited in claim 27, in which:
the calibration factor generator generates the calibration factor at least in part based on a position error signal indicative of a position of the head relative to the disk; and
the duration of the decay period is predetermined to allow the position error signal to return to a steady state range.

29. A servo system as recited in claim 21, in which the calibration factor generator generates the calibration factor at least in part based on a position error signal indicative of a position of the head relative to the disk.

30. A servo system as recited in claim 21, in which the calibration factor generator generates the calibration factor at least in part based on a plurality of samples of a position error signal indicative of a position of the head relative to the disk.

31. A servo system as recited in claim 30, in which the calibration factor generator generates the calibration factor at least in part based on an average of the plurality of samples of the error position signal.

32. A servo system as recited in claim 30, in which the calibration factor generator generates the calibration factor based on a subset of the plurality of samples of the position error signal.

33. A servo system as recited in claim 32, in which the calibration factor generator generates the calibration factor based on only those samples of the position error signal meeting predetermined reasonableness criteria.

34. A servo system as recited in claim 30, in which the calibration factor generator signals that a fault condition exists based on samples of the position error signal.

35. A servo system as recited in claim 34, in which the calibration factor generator signals that the fault condition exists when a predetermined number of samples of the position error signal do not meet predetermined reasonableness criteria.

36. A servo system as recited in claim 21, in which the calibration signal is a rectangular wave.

37. A servo system as recited in claim 36, in which the calibration portions of the calibration signal are the transitions of the calibration signal from low to high and high to low.

38. A servo system as recited in claim 36, in which the calibration signal has a duty cycle of approximately fifty percent.

39. A servo system as recited in claim 36, in which the period of the calibration signal is predetermined based on response characteristics of the third servo loop.

40. A servo system as recited in claim 36, in which the period of the calibration signal is predetermined to allow a position error signal indicative of a position of the head relative to the disk to return to a steady state range.

41. In a dual-stage actuator system comprising first and second stages for displacing a head relative to a disk of a hard disk drive, a method of calibrating the second stage comprising the steps of:
displacing the head relative to the disk based on first and second servo loops incorporating the first and second stages of the dual-stage actuator;
correcting the second stage of the dual-stage actuator of the dual stage actuator based on a calibration factor;
generating a calibration signal having at least one calibration portion;
forming a third servo loop incorporating the first stage of the dual-stage actuator system;
applying the calibration signal to the second stage of the dual-stage actuator system; and
generating the calibration factor based on movement of the head in response to the calibration signal before any substantial response by the third servo loop to the at least one calibration portion of the calibration signal.

42. A calibration method as recited in claim 41, in which the step of generating the calibration signal comprises the step of generating a plurality of calibration portions.

43. A calibration method as recited in claim 41, in which the step of generating the calibration signal comprises the step of generating at least one step disturbance.

44. A calibration method as recited in claim 41, in which the first stage of the dual-stage actuator has a wider gain distribution than the second stage of the dual-stage actuator.

45. A calibration method as recited in claim 41, in which the calibration signal comprises a plurality of step disturbances.

46. A calibration method as recited in claim 41, further comprising the steps of:
 predetermining a measurement period after which the first stage begins to respond to the calibration portion of the calibration signal; and
 generating the calibration factor during the measurement period.

47. A calibration method as recited in claim 42, further comprising the steps of:
 predetermining a measurement period after which the first stage begins to respond to the calibration portion of the calibration signal;
 generating the calibration factor during the measurement period; and
 predetermining a decay period between successive calibration portions of the calibration signal such that the first stage substantially stops responding to one calibration portion before the next calibration portion occurs.

48. A calibration method as recited in claim 47, further comprising the steps of:
 generating the calibration factor at least in part based on a position error signal indicative of a position of the head relative to the disk; and
 predetermining the duration of the decay period such that the position error signal substantially returns to a steady state range.

49. A calibration method as recited in claim 41, in which the calibration factor is generated at least in part based on a position error signal indicative of a position of the head relative to the disk.

50. A calibration method as recited in claim 41, in which the calibration factor is generated at least in part based on a plurality of samples of a position error signal indicative of a position of the head relative to the disk.

51. A calibration method as recited in claim 50, in which the calibration factor is generated at least in part based on an average of the plurality of samples of the error position signal.

52. A calibration method as recited in claim 50, in which the calibration factor is generated based on a subset of the plurality of samples of the position error signal.

53. A calibration method as recited in claim 52, in which the calibration factor is generated based on only those samples of the position error signal meeting predetermined reasonableness criteria.

54. A calibration method as recited in claim 50, further comprising the step of signaling a fault condition based on samples of the position error signal.

55. A calibration method as recited in claim 54, in which the step of signaling that the fault condition exists comprises the step of determining whether a predetermined number of samples of the position error signal do not meet predetermined reasonableness criteria.

56. A calibration method as recited in claim 41, in which the step of generating the calibration signal comprises the step of generating a rectangular wave.

57. A calibration method as recited in claim 56, in which the calibration portions of the calibration signal are the transitions of the calibration signal from low to high and high to low.

58. A calibration method as recited in claim 56, in which the step of generating the rectangular wave comprises the step of generating a rectangular wave having a duty cycle of approximately fifty percent.

59. A calibration method as recited in claim 56, in which the step of generating the rectangular wave comprises the step of predetermining the period of the calibration signal based on response characteristics of the third servo loop.

60. A calibration method as recited in claim 56, in which the step of predetermining the period of the calibration signal comprises the step of predetermining the period of the calibration signal to allow a position error signal indicative of a position of the head relative to the disk to return to a steady state range.

* * * * *